INVENTORS.
JAMES H. GRIESMER
ERIC G. WAGNER
BY
Thomas & Crickenberger

Feb. 26, 1963 J. H. GRIESMER ET AL 3,079,083

CRYOGENIC ADDER

Filed Jan. 19, 1960 7 Sheets-Sheet 2

CRYOGENIC ADDER

Filed Jan. 19, 1960 7 Sheets-Sheet 4

CRYOGENIC ADDER

Filed Jan. 19, 1960 7 Sheets-Sheet 6

3,079,083

CRYOGENIC ADDER

James H. Griesmer, Ossining, and Eric G. Wagner, New York, N.Y., assignors to International Business Machines Corporation, New York, N.Y., a corporation of New York Filed Jan. 19, 1960, Ser. No. 3,302
7 Claims. (Cl. 235—176)

The present invention relates to adding circuits and more particularly to cryogenic adders employing inhibitor circuitry.

The field of supercooled circuits (cryogenics) has found many new applications in computer technology, and in numerous instances the use of supercooled circuits with superconductive properties has proved more satisfactory than the vacuum tubes, transistors or magnetic devices having conventional acceptance. One of the basic superconductive devices employed in computer constructions is the cryotron. A cryotron may be a four terminal element including a straight wire placed inside a coil of different material and cooled to its superconductive temperature. At this temperature a very small voltage is sufficient to induce a persistent current in the straight wire provided that no current is present in the coil. A current in the coil, however, will produce a magnetic field to change the superconductive properties of the straight wire and cause the persistent current to cease. Thus, the cryotron utilizes the fact that the superconductive transition of a material depends upon both temperature and electromagnetic field. The inherent characteristics of such a device enable it to perform switching and inhibiting functions which are readily adaptable to computer applications.

An array of cryotrons may be constructed in which horizontal and vertical lines are arranged in a lattice configuration with the cryotron elements being connected in the array at the crossover or interaction points between the horizontal and vertical lines. The cryotrons serve as inhibitors to control the currents applied to the array and thereby enable the array to perform certain logical functions.

In an illustrative arrangement according to this invention a serial adder uses rectangular array inhibitor logic. Signals from input storage devices along with control signals from a stepping switch cause all but certain lines of a cryotron adder input array to be inhibited. Currents through the uninhibited lines serve as inputs to the adder array thereby causing current through certain output lines of the adder array to be inhibited. A carry input is applied to the adder array thereby inhibiting current in additional output lines of the adder array. Currents through the remaining output lines of the adder array appear as sum and carry signals or bits. The carry bit is stored and subsequently applied as an input to the adder array. The inhibiting action produced by a stepping switch permits the sum bit to be stored in a desired storage device. By this arrangement a small and compact adder is provided which, because of the absence of resistance in the lines of the adder, requires very little control power and generates only a minimum amount of heat.

These and other features of this invention may be more fully appreciated when considered in the light of the following specification and drawings in which.

Figure 1:
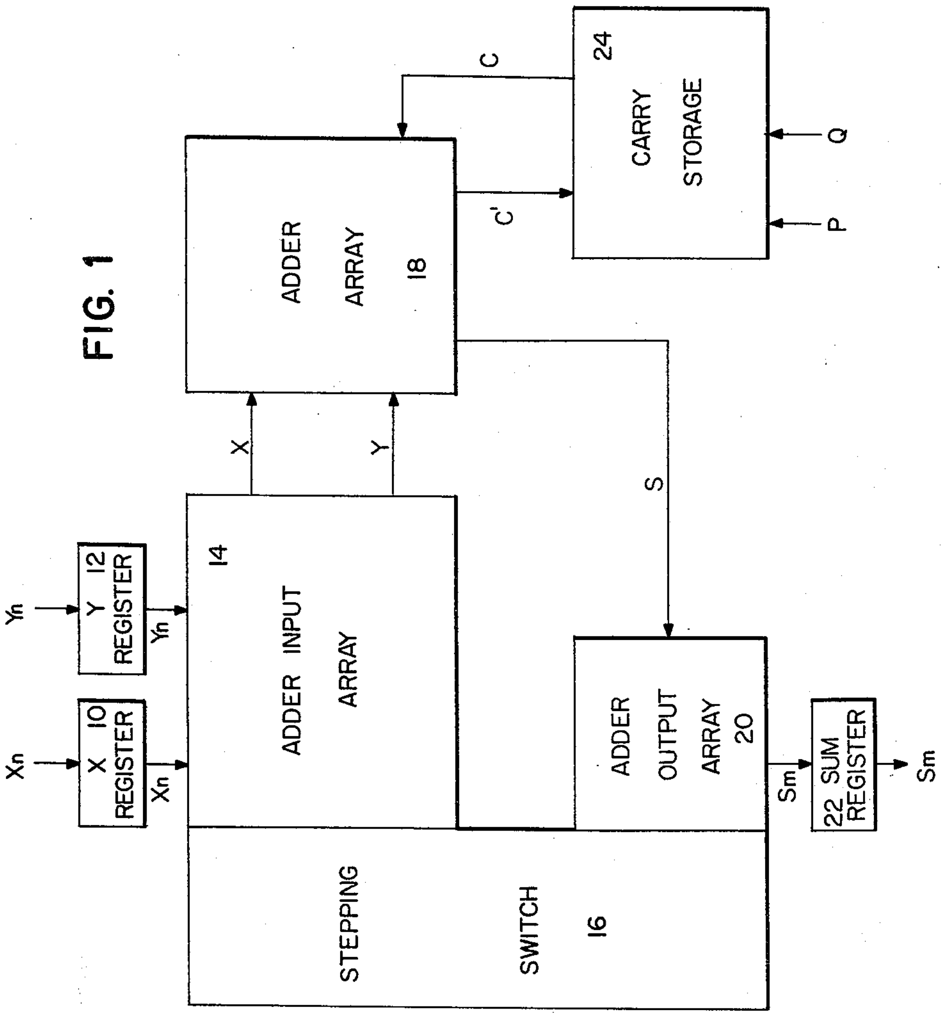
FIG. 1 is a block diagram of an adder employing the principles of the present invention.

FIG. 1 is a block diagram of a cryogenic adder constructed in accordance with the principles of the present invention. The adder is illustrated and described as a serial binary adder. A binary number $X_n$ (the *n* denoting the number of bits in the number X and consequently the number of storage devices within the X register as will be explained in greater detail hereinafter) is applied to the X register 10 which has *n* outputs. A number $Y_n$ which is to be added to the number $X_n$ is applied to a Y register 12 which has *n* outputs. The X and the Y outputs of the register 10 and the register 12, respectively, are applied to an adder input array 14. These input signals, along with the action of a stepping switch 16, cause certain paths to be inhibited and thereby determine superconductive paths in the adder input array 14 through which the X and Y bits or signals from the stages of the registers 10 and 12 may be sequentially applied to an adder array 18. The adder array 18 provides sum bits or signals S which, together with the action of the stepping switch 16, control an adder output array 20 to store *m* bits (where $m=n+1$) in a sum register 22. The adder array 18 also receives a carry bit C from a carry storage circuit 24. The adder array 18 generates a carry bit C′ which is stored in the carry storage circuit 24 during the addition of an X bit and a Y bit, and the carry storage circuit 22 subsequently applies this carry bit C′ as the carry bit C to the adder array 18 during the next succeeding addition of an X bit and a Y bit. Inputs P and Q applied to the carry storage circuit 24 cause the carry bit C′ to be stored and subsequently applied to the adder array 18 as a carry bit C.

Figure 3:
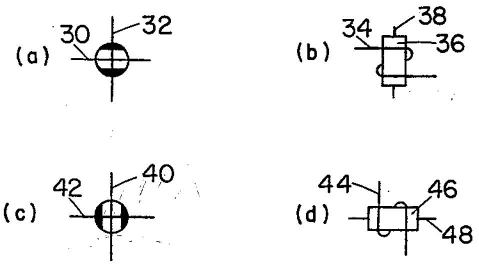
FIG. 3 is an illustration of inhibitor symbols used throughout the drawings.

FIG. 3*a* illustrates the symbol used for an inhibitor in the circuits illustrated in FIGS. 4 through 8. Current through a line 30 inhibits current through a line 32 whenever there is an alternate superconductive path for the current in the line 32. The action of the inhibitor illustrated in FIG. 3*a* will be readily apparent by reference to the symbol for a wire wound inhibitor or cryotron shown in FIG. 3*b*. The inhibitors illustrated in FIGS. 3*a* and 3*c* are equivalent to the wire wound gates shown in FIGS. 3*b* and 3*d*. Current through a winding 34 makes a gate 36 go resistive (normal) thereby blocking current through a line 38 whenever an alternate superconductive path is present. The inhibitor symbol illustrated in FIG. 3*c* is the same as that illustrated in FIG. 3*a* except that it is rotated ninety degrees. Current through a vertical line 40 inhibits current through a horizontal line 42 whenever an alternate superconductive path is present in the same manner that current through a winding 44 of the cryotron symbol in FIG. 3*d* drives a gate 46 normal thereby inhibiting current through a line 48.

Each of the gate lines of the cryotrons in the circuits disclosed herein is constructed of a material which is in a superconductive state at the operating temperature of the circuit in the absence of a magnetic field, but which is driven resistive (normal) by a magnetic field produced when a current greater than a predetermined minimum or threshold current exists in its control winding. The remaining portions of the circuit, that is, the control windings and the connections between the various components are fabricated of a superconductor material which remains in a superconductive state under all conditions of circuit operation. For example, the gates may be constructed of tantalum and the remaining portions of the circuit may be constructed of niobium, or other suitable materials, such as those discussed in the article by D. A. Buck, "The Cryotron—A Superconductive Computer Component," Proceedings of the IRE, pp. 482–493; April 1956, may be employed. Film-type cryotrons are preferably employed in circuits constructed and operated in accordance with the principles of the present invention. For a detailed discussion of film-type cryotrons and the manner in which they may be constructed, reference may be made to the copending applications, Serial No. 625,512 and Serial No. 765,760 filed on November 30, 1956, and October 7, 1958, respectively, both of which have been assigned to the assignee of the present invention.

Figure 4:
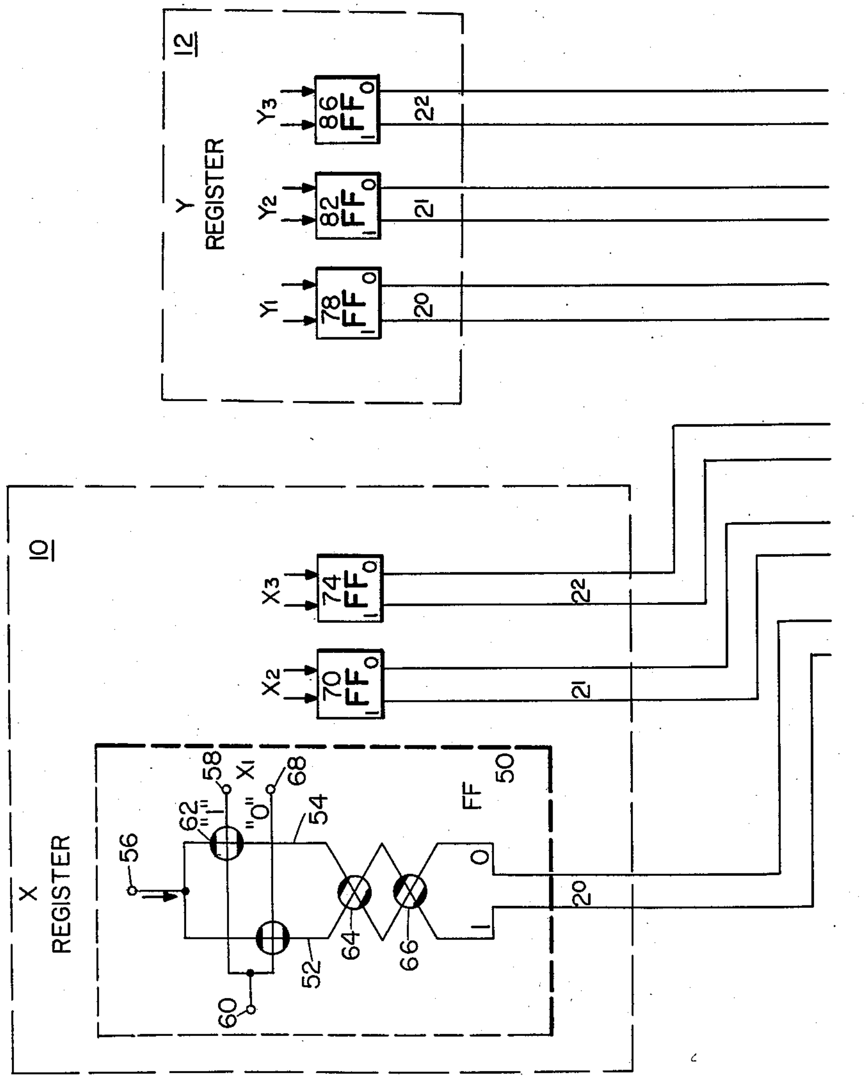
FIG. 4 illustrates the X and Y registers of the present invention.

Referring to FIG. 4, the X register 10 and the Y register 12 are illustrated in detail. Each of the registers 10 and 12 includes three bistable storage devices such as flip-flops. The register 10 includes a first stage flip-flop 50, a second stage flip-flop 70 and a third stage flip-flop 74. The register 12 includes a first stage flip-flop 78, a second stage flip-flop 82 and a third stage flip-flop 86. Inputs $X_1$, $X_2$ and $X_3$ are applied to the flip-flops 50, 70 and 74 of the register 10, and inputs $Y_1$, $Y_2$ and $Y_3$ are applied to the flip-flops 78, 82 and 86 of the register 12. These flip-flops, as are the remaining flip-flops illustrated through the various figures in the drawings, are essentially identical and therefore only one flip-flop, the flip-flop 50, is illustrated in detail.

The flip-flop 50 of the register 10 shown in FIG. 4 includes two paths or lines 52 and 54. Current is present in one of these lines 52 or 54 to the exclusion of the other upon the application of a Zero or a One signal to the $X_1$ input. When the $X_1$ input is a One, there is current from a terminal 58 to a terminal 60 which causes the cryotron or inhibitor 62 to inhibit current from a terminal 56 through the line 54. Hence, there is current from the terminal 56 through the line 52, through an inhibitor 64 and through an inhibitor 66. When there is current through the inhibitor 66 this inhibitor blocks current through the line 54. Therefore, the One input applied to the terminal 58 may be removed if desired since now the current through the line 52 causes the inhibitor 66 to block current through the line 54. The line 52 may be called the One line of the flip-flop since current is caused through that line when a One is applied to the flip-flop 50. When a Zero is applied to the $X_1$ terminal 68, current through the line 52 is inhibited, and a current is present from the terminal 56 through the line 54. Although the $X_1$ input lines are illustrated as horizontal and the $X_2$, $X_3$, $Y_1$, $Y_2$ and $Y_3$ lines are shown as vertical, this is done for simplicity of illustration and all of these lines are equivalent.

Only three stages are illustrated in each of the registers 10 and 12, but it will be readily apparent after a description of the entire adder circuit that any number of these stages may be employed in circuits constructed in accordance with the principles of the present invention. Each of the flip-flops of the registers 10 and 12 has a pair of output lines which include a One output line and a Zero output line. These pairs of lines are coupled with vertical pairs of lines in the adder input array 14 of FIG. 5 to control the diversion of currents in the horizontal pairs of lines of the adder input array.

Figure 5:
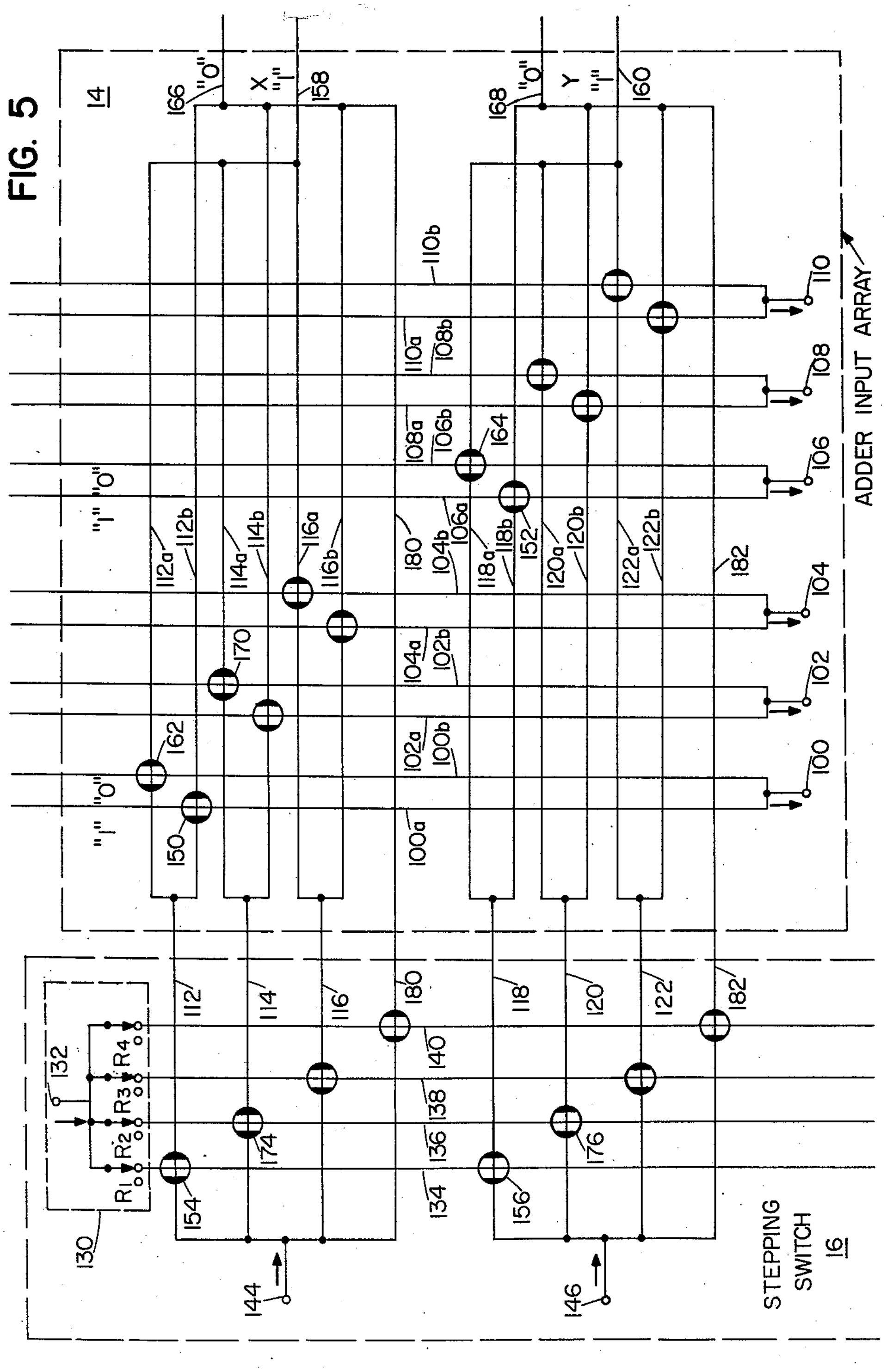
FIG. 5 illustrates the adder input array and the upper half of the stepping switch of the present invention.

Referring now to FIG. 5, the adder input array 14 is shown connected to the upper half of the stepping switch 16. The adder input array 14 includes three pairs of vertical wires 100a and 100b, 102a and 102b, and 104a and 104b which are connected to the flip-flops 50, 70 and 74, respectively, of the register 10 of FIG. 4. Three pairs of vertical wires 106a and 106b, 108a and 108b, and 110a and 110b are respectively connected to the flip-flops 78, 82 and 86 of the register 12 of FIG. 4. Each left-hand wire of the pairs of vertical wires of the adder input array 14 is connected to the One side of the corresponding flip-flop of FIG. 4. Each right-hand wire of these pairs of wires is connected to the Zero side of the corresponding flip-flop of FIG. 4. Three pairs of horizontal wires 112a and 112b, 114a and 114b, and 116a and 116b of the adder input array 14 are associated with the register 10 of FIG. 4 and are coupled with the stepping switch 16. Three pairs of horizontal wires 118a and 118b, 120a and 120b, and 122a and 122b are associated with the register 12 of FIG. 4 and are coupled with the stepping switch 16. The vertical lines 100a and 100b, 102a and 102b, and 104a and 104b are connected to output terminals 100, 102 and 104, respectively. The vertical lines 106a and 106b, 108a and 108b, and 110a and 110b are connected to output terminals 106, 108 and 110, respectively. The horizontal lines 112a and 112b, 114a and 114b, and 116a and 116b of the adder input array 14 are connected to the stepping switch 16 through lines 112, 114 and 116, respectively. The horizontal lines 118a and 118b, 120a and 120b, and 122a and 122b of the adder input array 14 are connected to the stepping switch 16 through lines 112, 114 and 116, respectively.

The upper half of the stepping switch 16 shown in FIG. 5 includes a selector switch 130. The selector switch 130 includes four switches $R_1$, $R_2$, $R_3$ and $R_4$. The switches $R_1$ through $R_4$ connect an input terminal 132 to four vertical lines 134, 136, 138 and 140, respectively. These vertical lines 134, 136, 138 and 140 extend to a common output terminal 142 (illustrated in FIG. 7). The switches $R_1$ through $R_4$ are illustrated as mechanical type switches because it is believed that this type of representation provides a more graphic illustration of their operation. However, it is to be understood that these switches are preferably superconductive devices similar to those disclosed herein. The switches $R_1$ through $R_4$ are operated one at a time, that is, only one of these switches is open at any time. Current is normally present from the terminal 132 through each of the closed switches. During an adding operation of two three-bit binary numbers applied to the registers 10 and 12 (FIG. 4), $R_1$ is opened, $R_2$ is opened and $R_1$ is closed, $R_3$ is opened and $R_2$ is closed and $R_4$ is opened and $R_3$ is closed.

In the operation of the adder input array 14, current is initiated sequentially through either the left-hand (One) or the right-hand (Zero) vertical wire of each of the six pairs of vertical wires depending upon the state of each of the flip-flops of FIG. 4 connected to these pairs of vertical wires. According to a feature of this invention, when there is current through any one of these vertical wires, the inhibitor on a vertical wire inhibits current through a horizontal wire crossing that particular inhibitor. For example, assume current through the vertical line 100a and through the vertical line 106a as is the case when the flip-flops 50 and 78 of FIG. 4 are in the One state (a binary One has been applied to the first stages of the registers 10 and 12 of FIG. 4). The switch $R_1$ is now opened and there can be no current from the terminal 132 through the line 134 of the stepping switch 16 and, therefore, inhibitors 154 and 156 do not inhibit current in lines 112 and 118. There is current from a terminal 144 through the inhibitor 154 and through the line 112, and also from a terminal 146 through the inhibitor 156 and the line 118. Since there is current through the vertical lines 100a and 106a, inhibitors 150 and 152 cause current to be inhibited from the horizontal lines 112b and 118b, respectively. Hence, there is current in the line 112 through the line 112a to an X One output line 158. There is current in the line 118 through the line 118a to a Y One output line 160. Conversely, if there is current through the Zero lines 100b and 106b instead of through the One lines 100a and 106a, inhibitors 162 and 164 would inhibit current in the lines 112a and 118a, respectively. In this case there would be current from the line 112 through the line 112*b* to an X Zero output terminal 166 and also current from the line 118 through the line 118*b* to a Y Zero output terminal 168.

As a further illustration of the operation of the adder input array 14 assume that the switch $R_2$ is open, that the switch $R_1$ is closed, and that there is current through the Zero line 102*b* and the Zero line 108*b* (as is the case when the flip-flops 70 and 82 of FIG. 4 are in the Zero state). Inhibitors 170 and 172 inhibit current in the lines 114*a* and 120*a*, respectively. Current is present from the terminal 144 through an inhibitor 174, the line 114, the line 114*b* to the Y Zero output line 166. There is also current from the terminal 146 through an inhibitor 176, the line 120, the line 120*b* to the Y Zero output line 168. It is believed that the operation of the entire adder input array 14 and stepping switch 16 is apparent from the above description. The remaining inhibitors in the adder input array 14 and in the stepping switch 16 operate in a similar manner to divert current from certain horizontal lines through two particular horizontal lines to the X output lines 158 or 166 and the Y output lines 160 or 168.

Any three bit binary number may be applied to each of the registers 10 and 12 of FIG. 4. By the operation of the switches $R_1$ through $R_4$ the $X_1$ and the $Y_1$ bits (from the first stages of the registers 10 and 12, respectively) are gated to the X and Y output lines of the adder input array 14 followed by the $X_2$ and the $Y_2$ bits, and the $X_3$ and the $Y_3$ bits. If more input stages are desired in the registers 10 and 12 of FIG. 4 pairs of vertical lines for each additional stage in each register corresponding to the pairs of vertical lines 100*a* and *b*, 106*a* and *b*, 102*a* and *b*, 108*a* and *b*, 104*a* and *b*, 110*a* and *b* are added to the adder input array 14 of FIG. 5. Also, additional pairs of horizontal lines corresponding to the lines 112*a* and *b*, 118*a* and *b*, 114*a* and *b*, 120*a* and *b*, 116*a* and *b* and 122*a* and *b* with their associated stepping switch lines 112, 118, 114, 120, 116 and 122, respectively, are used. It should now be apparent that for each additional stage added in each of the registers 10 and 12 corresponding pairs of horizontal and vertical lines are required. Lines 180 and 182 are included in the stepping switch 16 and the adder input array 14 to provide an $X=Y=0$ output from the adder input array 14 and, consequently, an input to the adder array illustrated in FIG. 6 to gate through the final carry signal to the highest stage (the fourth as illustrated) of the sum register 22. The X and Y outputs from the lines 158 and 166, and the lines 160 and 168, respectively, of the adder input array 14 are applied to corresponding horizontal lines in the adder array illustrated in FIG. 6.

The adder array includes the X input lines 158 and 166 and the Y input lines 160 and 168 all of which are coupled from the output of the adder input array 14 shown in FIG. 5. The adder array 18 includes another set of horizontal lines 200 and 202 which provide input carry bits C to the adder array. Four sets of vertical lines intersect the X, Y and C horizontal lines. The first set of these lines 204*a*, 204*b*, 204*c* and 204*d* provides a sum output bit or signal S of One. The second set of these lines 206*a*, 206*b*, 206*c* and 206*d* provides a sum output bit S of Zero. The third and fourth sets of the vertical lines of the adder array 18 include lines 208*a*, 208*b*, and 208*c* for providing a carry output bit C′ of One, and lines 210*a*, 210*b* and 210*c* for providing a carry output bit C′ of Zero.

Figure 6:
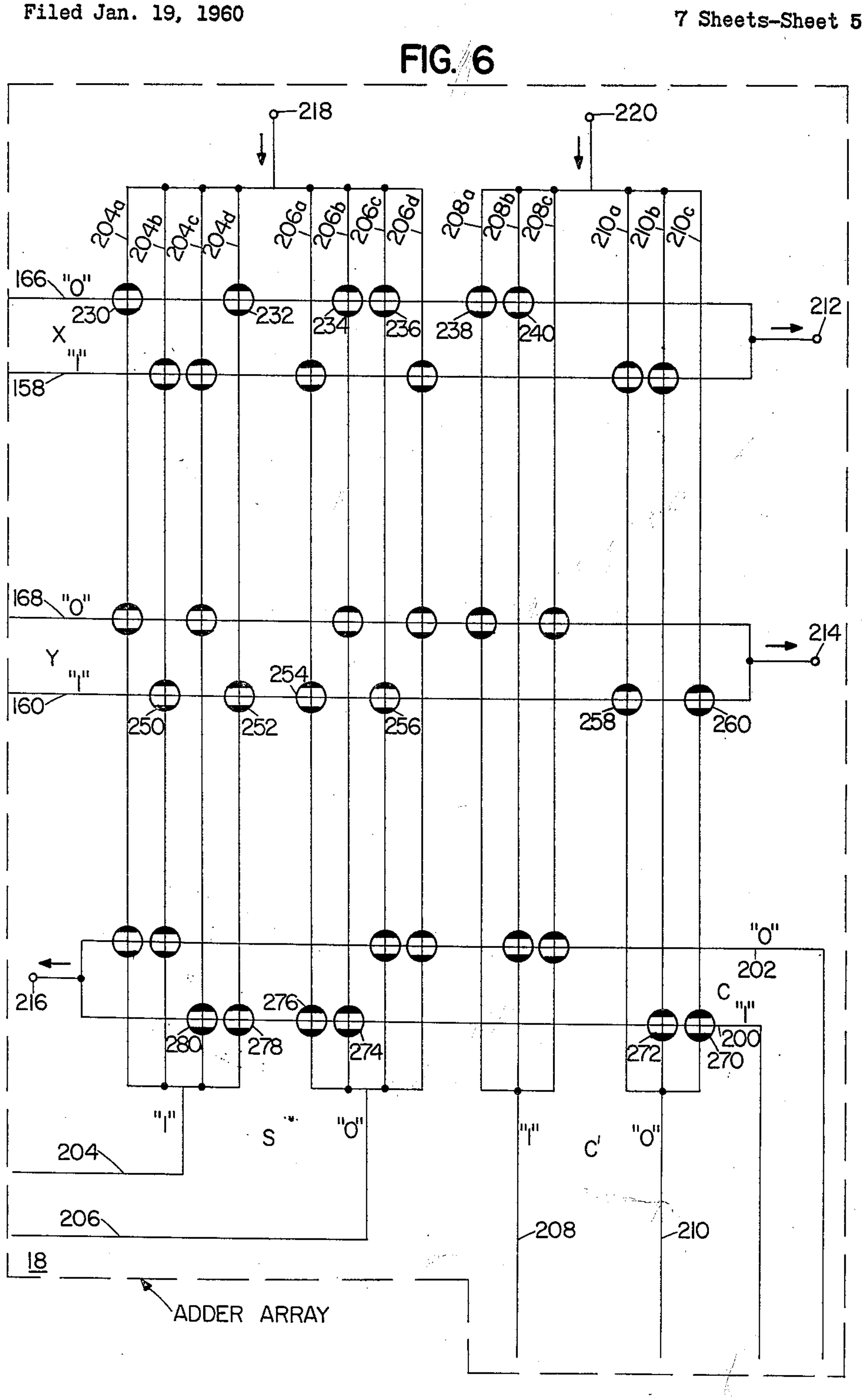
FIG. 6 is an illustration of the adder array constructed according to this invention.

The X, Y and C input currents to the adder array 18 of FIG. 6 are present on the horizontal lines to output terminals 212, 214 and 216, respectively. The sum output currents S are present on the vertical sum lines 204*a* through *d* and 206*a* through *d* to the output lines 204 and 206. The output carry signals C′ flow from the terminal 220 through the vertical carry lines 208*a* through *c* and 210*a* through *c* to the output carry lines 208 and 210. According to another aspect of this invention, input currents in the One or the Zero lines of the X, Y and C inputs (158 and 166, 160 and 168, and 200 and 202, respectively) cause all but one of the sum vertical lines 204*a* through *d* and 206*a* through *d* to be inhibited, and all but one of the carry output lines 208*a* through *c* and 210*a* through *c* to be inhibited. In other words, the input signals X, Y and C cause particular output lines to be inhibited thereby leaving certain superconductive lines through which output sum bits S and carry bits C′ may flow.

The following truth table, Table I, illustrates the eight possible inputs to the X, Y and C input lines of the adder array 18 along with the resulting output sum signals S and carry signals C.

*Table I*

| | Inputs | | | Outputs | |
|---|---|---|---|---|---|
| | X | Y | C | S | C |
| 1 | 0 | 1 | 1 | 0 | 1 |
| 2 | 0 | 0 | 1 | 1 | 0 |
| 3 | 1 | 0 | 1 | 0 | 1 |
| 4 | 1 | 1 | 1 | 1 | 1 |
| 5 | 0 | 1 | 0 | 1 | 0 |
| 6 | 0 | 0 | 0 | 0 | 0 |
| 7 | 1 | 0 | 0 | 1 | 0 |
| 8 | 1 | 1 | 0 | 0 | 1 |

Assuming the condition number 1 illustrated in the above table, when X is a Zero, there is current through the horizontal line 166 of the adder array 18 shown in FIG. 6; when Y is a One, there is current through the horizontal line 160; and when C is a One, there is current through the horizontal line 200. Current through the line 166 causes inhibitors 230, 232, 234, 236, 238 and 240 to inhibit current in the vertical lines 204*a*, 204*d*, 206*b*, 206*c*, 208*a* and 208*b*, respectively. Current through the line 160 causes inhibitors 250, 252, 254, 256, 258 and 260 to inhibit current through the vertical lines 204*b*, 204*d*, 206*a*, 206*c*, 210*a* and 210*c*, respectively. Current through the line 200 causes inhibitors 270, 272, 274, 276, 278 and 280 to inhibit current through the vertical lines 210*c*, 210*b*, 206*b*, 206*a*, 204*d* and 204*c*, respectively. Current is not inhibited in lines 206*d* and 208*c*. Current is present from the terminal 218 through the vertical line 206*d* and through the sum S Zero output line 206. There is also current from the terminal 220 through the vertical line 208*c* and through the carry C′ One output line 208. Hence, when X is a Zero, Y is a One, and C is a One, the adder array 18 generates a sum bit S of Zero and a carry bit C′ of One.

For the second condition illustrated in the above Table I, the X input bit is a Zero, the Y input bit is a Zero, and the carry input bit C is a One. As noted above, when the X input bit is a Zero, there is current through the horizontal line 166, and when the carry input bit C is a One, there is current through the horizontal line 200. When the Y input bit is a Zero, there is current through the horizontal line 168. Current through the horizontal line 166 causes the inhibitors on that line to inhibit current through the vertical lines 204*a*, 204*d*, 206*b*, 206*c*, 208*a* and 208*b*. Current through the horizontal line 168 causes the inhibitors on that line to inhibit current through the vertical lines 204*a*, 204*c*, 206*b*, 206*d*, 208*a* and 208*c*. Current through the horizontal line 200 causes the inhibitors on that line to inhibit current through the vertical lines 210*c*, 210*b*, 216*b*, 206*a*, 204*d* and 204*c*. All of the vertical lines are inhibited except the line 204*b* and 210*a*. Hence, current is present through the line 204*b* and the line 204 resulting in a sum output of One, and current is present through the line 210*a* and the line 210 resulting in an output carry of Zero. The adder array 18 is operated in a similar manner for the remaining conditions illustrated in the above Table I, and it is believed that the operation of the adder array is obvious for these remaining conditions.

It is now apparent that Zero or One input bits to the X, Y and C inputs of the adder array 18 cause current to be inhibited through certain of the vertical lines of the array thereby providing One or Zero sum S and carry C′ output bits. The carry output bit C′ is applied to a carry storage circuit illustrated in FIG. 8, and the carry input bit C is provided from the carry storage circuit as will be explained hereinafter. The sum output bit S of the adder array is applied to an adder output array 20 illustrated in FIG. 7 through lines 204 and 206.

Figure 7:
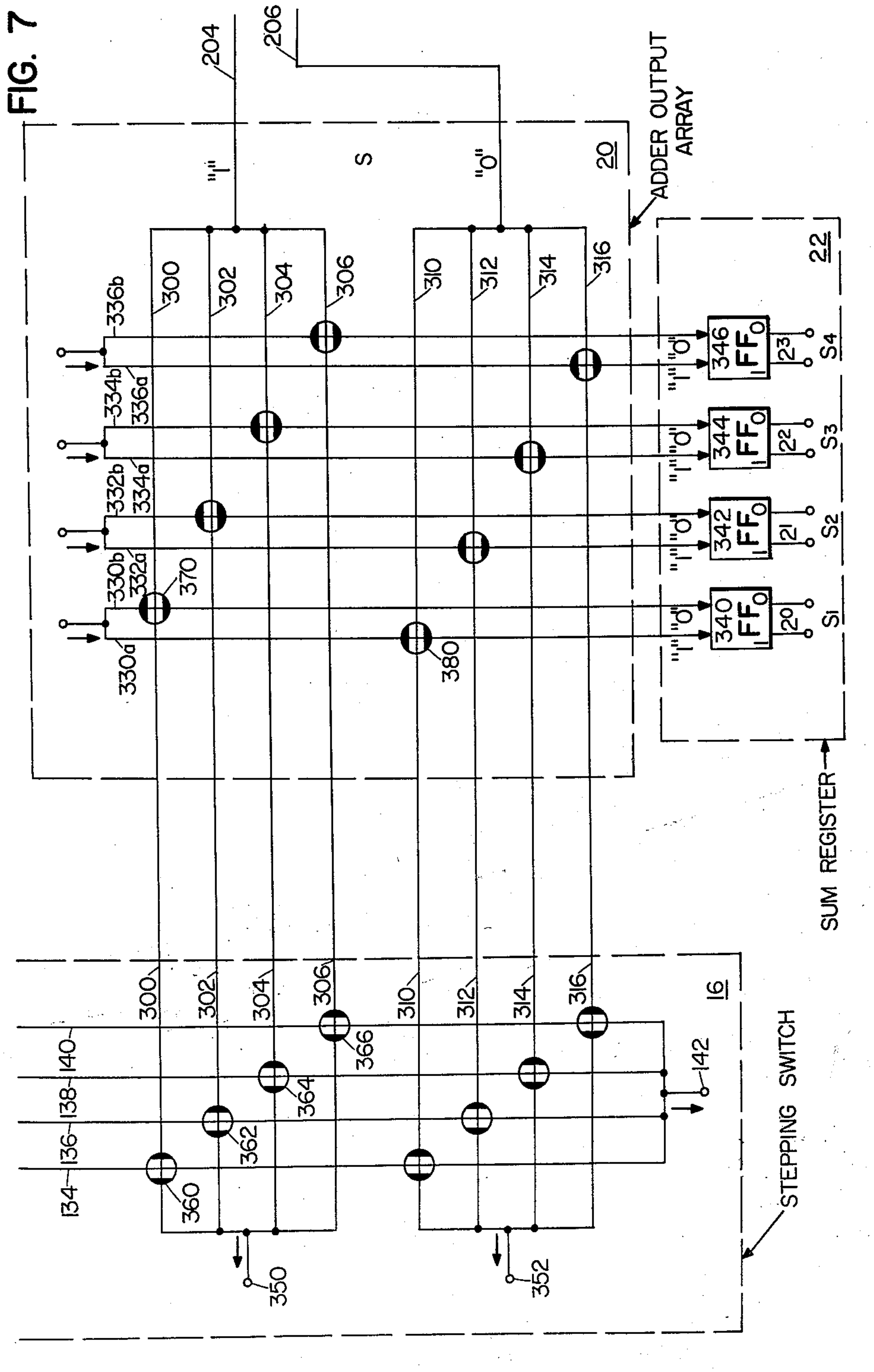
FIG. 7 illustrates the adder output array, the sum register and the lower half of the stepping switch according to this invention.

Referring now to FIG. 7, the adder output array 20, the sum register 22 and the lower half of the stepping switch 16 are illustrated therein. The sum S One line 204 is connected to four horizontal lines 300, 302, 304, and 306 and the sum S Zero line 206 is connected to horizontal lines 310, 312, 314 and 316. The horizontal lines 300, 302, 304 and 306 are connected to like numbered lines in the stepping switch 16. The horizontal lines 310, 312, 314 and 316 are also connected to like numbered lines in the stepping switch 16. Four pairs of vertical lines intersect the horizontal lines in the adder output array 20, and these vertical pairs of lines are connected to four flip-flops in the sum register 22. These pairs of vertical lines are numbered 330*a* and 330*b*, 332*a* and 332*b*, 334*a* and 334*b*, and 336*a* and 336*b* and are connected to the flip-flops 340, 342, 344 and 346, respectively, in the sum register 22.

According to another feature of this invention, in the operation of the adder output array 20 a sum input bit S on line 204 or 206 together with the operation of the stepping switch 16 causes that sum bit S to be gated through the adder output array 20 and to be stored in one of the flip-flops of the sum register 22. For example, assume that the switch $R_1$ of the upper half of the stepping switch 16 illustrated in FIG. 5 is open. There is then no current through the line 134 to the output terminal 142 of the lower half of the stepping switch 16 illustrated in FIG. 7. Since there is no current through the line 134 of the stepping switch 16, current through the line 300 is not inhibited by the inhibitor 360. Assume also that a sum input bit S of One is applied on line 204 to the adder output array 20. Current is present through the line 204, the line 300, an inhibitor 360 to an output terminal 350. There is no current through the lines 302, 304 and 306 since current through these lines is blocked by inhibitors 362, 364 and 366. Current through the line 300 causes an inhibitor 370 to block current through the vertical line 330*b*. There is then current through the vertical line 330*a* to the One side of the flip-flop 340 of the sum register 22. This causes the flip-flop 340 to switch to the One state if it was previously in the Zero state (which is the usual case since the flip-flops of the sum register 22 are initially set to Zero) or causes it to remain in the One state if it was previously in the One state. Note that current through the remaining vertical lines 332*a* and *b*, 334*a* and *b*, and 336*a* and *b* is not inhibited at this time by a One input on the line 204. However, the flip-flops 342, 344 and 346 of the sum register 22 are previously set, and since there is no current through the horizontal lines 302, 304, 306, 310, 312, 314 and 316, the states of these remaining flip-flops 342, 344 and 346 are not altered.

Inputs to the adder output array 20 in combination with the operation of the stepping switch 16 operate to store the sum bits S applied to the adder output array 20 in the flip-flops of the sum register 22 in the same manner as described above. As a further example, assume that a Zero sum input bit S is applied through the line 206 and that the switch $R_1$ is still open. There is current through the line 206, the line 310 and an inhibitor 380 to an output terminal 352 in the stepping switch 16. Current through the inhibitor 380 inhibits current through the vertical line 330*a* and consequently there is current through the vertical line 330*b* to the Zero side of the flip-flop 340. In a like manner sum bits S produced as a result of the X and the Y input bits applied to the registers 10 and 12 of FIG. 4 in the higher stages (stage 2, stage 3, etc.) are stored in the higher stages of the sum register 22 as the switches $R_1$ through $R_4$ of FIG. 5 are operated. In other words, $X_1$ and $Y_1$ input bits to the registers 10 and 12 of FIG. 4 are gated through the adder input array 14 of FIG. 5 to produce a sum bit S in the adder array 18 of FIG. 6. The sum bit S produced by the adder array 18 is applied to the adder output array 20 of FIG. 7 and stored in the first stage of the sum register 22 when the $R_1$ switch of the stepping switch 16 of FIG. 5 is open. In a like manner, the operation of the switches $R_2$, $R_3$ and $R_4$ causes sum bits S to be stored in the second, third and fourth stages of the sum register 22.

Figure 8:
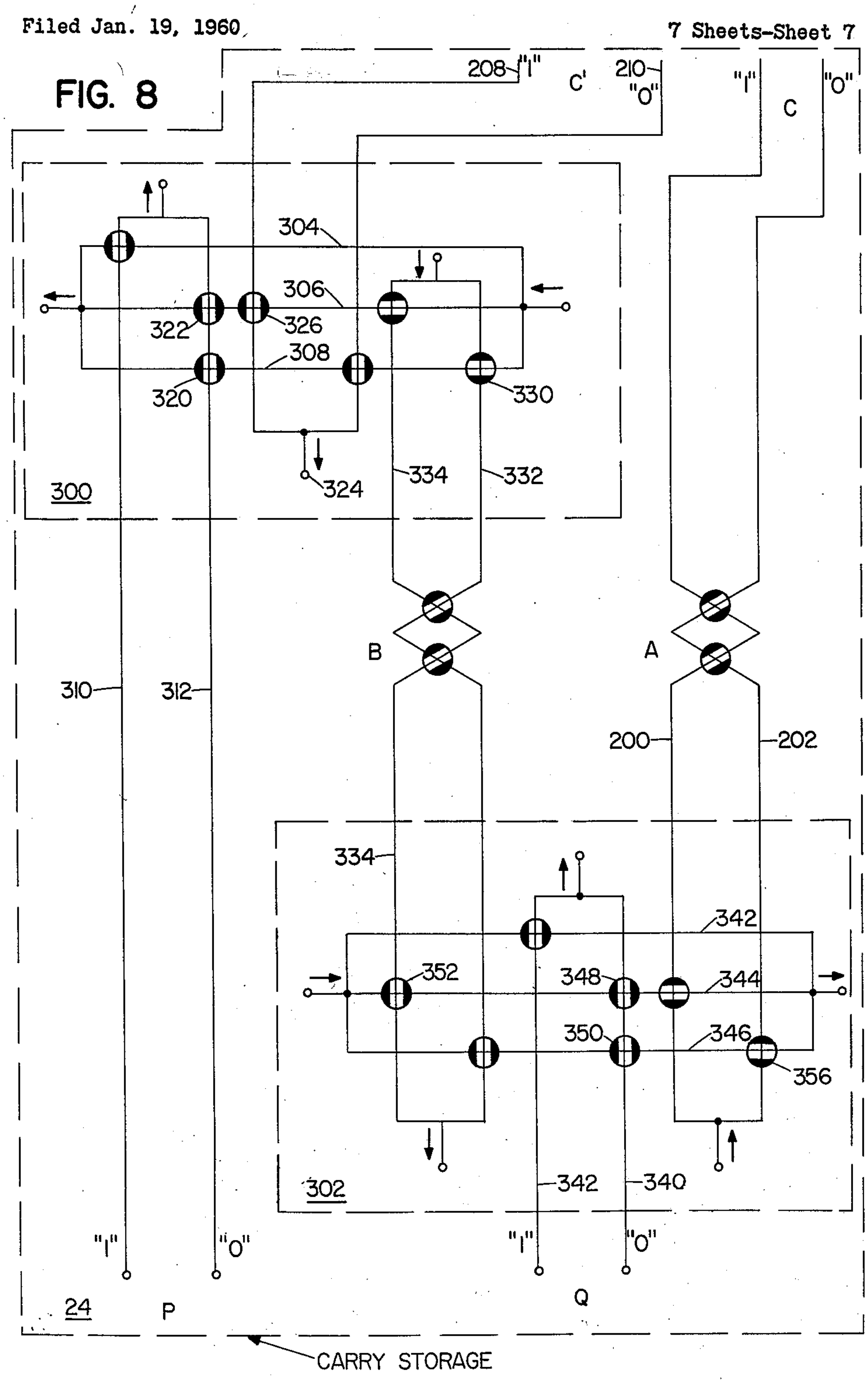
FIG. 8 illustrates a carry storage circuit in accordance with the present invention.

Referring now to FIG. 8, a carry storage circuit is illustrated for storing the carry bit C′ generated in the adder array 18 of FIG. 6 and subsequently applying this stored carry bit as the input carry bit C to the adder array 18. The carry storage circuit includes a gate 300 connected to a flip-flop B. The flip-flop B is connected to a gate 302 which is connected to a flip-flop A. The output carry lines 208 and 210 from the adder array 18 of FIG. 6 intersect three horizontal lines 304, 306 and 308 within the gate 300. A pair of vertical lines 310 and 312 intersect the horizontal lines 304, 306 and 308 in the gate 300. The pair of vertical lines 310 and 312 are connected respectively to the One and to the Zero terminals of the input P.

The P input to the gate 300 controls the storage of the carry signal signal C′ in the flip-flop B. When the P input is a Zero inhibitors 320 and 322 inhibit current through the horizontal lines 308 and 306 thereby causing current through the line 304. Since no current may exist in the horizontal lines 306 and 308 the carry bit C′ cannot set the flip-flop B. When the P input is a One, current is not inhibited in the horizontal lines 306 and 308 and the generated carry signal C′ is stored in the flip-flop B. Assuming that the generated carry signal C′ is a One, current through the line 208 to an output terminal 324 causes an inhibitor 326 to block current through the horizontal line 306. The only uninhibited current path through the horizontal lines of the gate 300 is the line 308. Hence, current through the line 308 causes an inhibitor 330 to inhibit current through a line 332 of the flip-flop B. Current through a line 334 of the flip-flop B sets that flip-flop in a One state. Conversely, if the generated carry signal C′ is a Zero, current through the horizontal line 306 thereby causes current through the line 332 of the flip-flop B thus setting the flip-flop B in the Zero state.

The output of the flip-flop B on the lines 332 or 334 along with an input Q on a line 340 or 342 controls the transfer of the carry bit from the flip-flop B to the flip-flop A. The gate 302 is constructed the same as the gate 300, and both of these gates operate in a similar manner. When a Zero is applied to the input Q, there is current through a line 340 thereby causing current through the horizontal lines 344 and 346 to be inhibited by the inhibitors 348 and 350, respectively. Since one of the horizontal lines 344 or 346 must be uninhibited for a transfer of the carry bit from the flip-flop B to the flip-flop A no transfer of this bit occurs. When a One is applied to the Q input, the carry bit stored in the flip-flop B is transferred to the flip-flop A. Assuming that a One is stored in the flip-flop B and that a One is applied to the Q input, there is then current through the line 334 to cause an inhibitor 352 to inhibit current in the horizontal line 344. Current is present only through the horizontal line 346 thereby causing an inhibitor 356 to inhibit current in the line 202. Current through the line 200 sets the flip-flop A, and current through the line 200 is taken to indicate that the flip-flop A is in the One state.

Each time two X and Y bits are added in the adder array 18 of FIG. 6 a carry bit C′ is generated and this carry bit is applied to the gate 300 of the carry storage circuit of FIG. 8. A One is applied to the P input and the generated carry bit C′ is stored in the flip-flop B. During the addition of the second X and Y bits a One is applied to the Q input which causes a transfer of the carry bit stored in the flip-flop B to the flip-flop A. The carry bit stored in the flip-flop A is applied as the carry C input to the adder array 18 of FIG. 6. A sum bit is generated by the adder array 18 and stored in the sum register 22 of FIG. 7, and a new carry bit C′ is generated. By switching the P input to a One this generated carry bit C′ is stored in the flip-flop B. During the addition of the third X and Y bits the carry signal stored in the flip-flop B is transferred to the flip-flop A, a sum bit is stored, and a new carry bit is generated. The carry storage circuit of FIG. 8 operates in a similar manner for each succeeding combination of X and Y inputs to the adder array 18 of FIG. 6. It is now seen that the carry storage circuit of FIG. 8 stores the carry bit generated during the addition of an X and a Y bit, and transfers this stored carry bit to the input of the adder array 18 during the next succeeding addition of an X and a Y bit.

Figure 2:
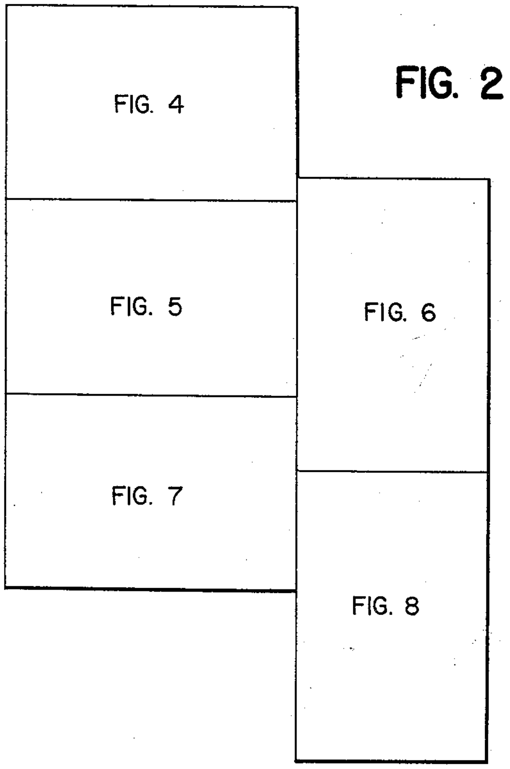
FIG. 2 is a diagram of the relationships of FIGS. 4 through 8.

The operation of the adder of the present invention is now described with reference to FIGS. 4 through 8. Note that FIG. 2 illustrates the relationships of FIGS. 4 through 8. According to a further feature of this invention, in operating the adder of the present invention input bits $X_1$, $X_2$ and $X_3$ are stored in the X register 10 and input bits $Y_1$, $Y_2$ and $Y_3$ are stored in the Y register 12 of FIG. 4. As the switches $R_1$, $R_2$, $R_3$ and $R_4$ of the stepping switch 16 illustrated in FIGS. 5 and 7 are sequentially opened and closed each corresponding X and Y input bit is gated through the adder input array 14 of FIG. 5 and applied to the adder array 18 of FIG. 6 which produces a sum bit S and a carry bit C′. The sum bits S generated during the adding operation are gated through the adder output array 20 of FIG. 7 and stored in the first, second, third and fourth stages of the sum register 22. Each carry bit produced by the adder array 18 of FIG. 6 is stored in the carry storage circuit illustrated in FIG. 8 and subsequently transferred back to the adder array 18 as an input carry bit C during the addition of the next succeeding X and Y bits.

As a specific example of the operation of the adder of the present invention, the addition of $X=3$ and $Y=6$ will be described. The binary numbers for these decimal numbers are 011 and 110, respectively. These binary numbers are applied to and stored in the X register 10 and the Y register 12. A One is applied to the first flip-flop 50, a One is applied to the second flip-flop 70 and a Zero is applied to the third flip-flop 74 of the X register 10 of FIG. 4. A Zero is applied to the first flip-flop 78, a One is applied to the second flip-flop 82 and a One is applied to the third flip-flop 86 of the Y register 12. The flip-flops A and B and the flip-flops of the sum register 22 are all set to Zero. The adder is now set to add the two binary numbers stored in the registers 10 and 12.

The switch $R_1$ of the stepping switch 16 is opened and the first X and Y bits One and Zero, respectively, are gated through the adder input array 14 and are applied to the adder array 18. The adder array 18 produces a One sum bit S and a Zero carry bit C′. The One sum bit S is gated through the adder output carry 20 and stored in the first flip-flop 340 of the sum register 22. The carry bit C for the addition of the first two X and Y bits is a Zero. A One input is applied to the P input and the generated Zero carry bit C′ is stored in the flip-flop B. The switch $R_1$ is closed as the switch $R_2$ is opened. A One input is applied to the Q input and the stored Zero carry bit in the flip-flop B is transferred to the flip-flop A.

When the switch $R_2$ is opened, the second X bit (a One) and the second Y bit (a One) are each gated through the adder input array 14 and applied to the adder array 18. The carry input bit C applied to the adder array 18 is a Zero at this time since there was a Zero carry from the previous operation. A Zero sum bit S is generated by the adder array 18, gated through the adder output array 20 and stored in the second flip-flop 342 of the sum register 22. A One carry bit C′ is generated by the adder array 18, and a One is applied to the P input to store this One carry bit in the flip-flop B. The switch $R_2$ is closed as the switch $R_3$ is opened. A One is applied to the Q input which causes the carry bit of One stored in the B flip-flop to be transferred to the A flip-flop. When the switch $R_3$ is open the third X bit (a Zero) and the third Y bit (a One) are each gated through the adder input array 14 and applied to the adder array 18. The adder array 18 generates a Zero sum bit S which is gated through the adder output array 20 and stored in the third flip-flop 344 of the sum register 22. The adder array 18 generates a One bit C′. A One is applied to the P input and the One carry bit C′ is stored in the B flip-flop. The switch $R_3$ is closed as the switch $R_4$ is opened. A One is applied to the input Q and the One carry bit stored in the B flip-flop is transferred to the A flip-flop.

When the switch $R_4$ is open there is current from the terminal 144 through the horizontal line 180 to the Zero X line 166 and also from the terminal 146 through the horizontal line 182 to the Zero Y line 168. Hence, at this time Zero X and Y bits are applied to the adder array 18 to gate through the final carry bit C of One. The adder array 18 produces a One sum bit S and this bit is gated through the adder output array 20 and stored in the fourth flip-flop 346 of the sum register 22. The adder array 18 also generates a Zero carry bit C′ which is stored in the B flip-flop by applying a One to the P input. The adding operation of the X and Y numbers is now complete and the result is stored in the sum register 22 as 1001 which is equal to the decimal number 9. The operation of the adder of the present invention is now apparent. The operation for adding other numbers is similar to that set forth above and it is believed that the above illustration is sufficient for an understanding of how to add any desired binary numbers.

It is now seen that the present invention provides a cryogenic serial adder employing rectangular array inhibitor logic. Input bits to be added are stored in input storage registers and signals from the input storage registers, along with a stepping switch, cause all but certain lines of an adder input array to be inhibited. Currents are present through the remaining lines of the adder input array to an adder array thereby causing certain output lines of the adder array to be inhibited. A carry input signal or bit is applied to the adder array thereby causing additional output lines of the adder array to be inhibited. Currents are present through the remaining output lines of the adder array as sum and carry bits. The generated carry bit is stored and subsequently applied as an input to the adder array during the addition of the next set of bits. The sum bit is stored in a desired sum storage device when the stepping switch inhibits storage in all but the desired storage device.

Although a three stage cryogenic serial binary adder is described and illustrated, it is to be understood, as pointed out in the above description, that more binary stages may be employed without departing from the principles of the present invention. The invention is not limited to cryotron inhibitor circuits since numerous inhibitor devices may be employed in adders constructed and operated according to the principles of inhibitor logic described. Furthermore, the invention is not limited to binary adders. Adders may be constructed according to the principles of the present invention which operate with any desired radix by changing the arrays and circuits herein illustrated to accommodate more inputs and outputs (three, four, etc.).

What is claimed is:

1. A serial adder employing rectangular array inhibitor logic comprising: a first register having a plurality of stages with a plurality of outputs; a second register having a plurality of stages with a plurality of outputs; an adder array including a plurality of interacting lines having inhibitors placed at selected points of interactions; first means to apply the outputs of corresponding stages of the first and the second registers to the adder array whereby current flow in certain of said lines is inhibited to provide sum and carry output signals from other of said lines; second means to store sum output signals; third means to store a carry output signal; whereby said serial adder sequentially adds the outputs from each corresponding stage of the first and the second registers and provides sum output signals and carry output signals, said second means stores said sum output signals, and said third means stores and sequentially applies said carry output signals to said adder array.

2. An adder employing rectangular array inhibitor logic comprising: a first input circuit and a second input circuit each of which has a plurality of stages with a plurality of outputs; each of said stages having a given number of outputs related to the radix employed; an adder array having a plurality of current paths; means to apply sequentially corresponding outputs of said input circuits to said adder array to inhibit currents in selected current paths therein; said adder array providing a sum signal and a carry signal as each of said corresponding outputs is applied thereto; means to store each of said sum signals; means to store each of said carry signals and subsequently to apply each of said carry signals to said adder array as said corresponding outputs are sequentially applied thereto.

3. An adder employing rectangular array inhibitor logic as in claim 2 wherein the number of outputs of each of said stages is two and said radix is two.

4. A cryogenic serial adder employing rectangular array inhibitor logic comprising: a first input circuit and a second input circuit each of which has a plurality of outputs; a first array, a switching array; an adder array; means coupling the outputs of each of said input circuits to said first array; means coupling said switching array to said first array; means coupling said first array to said adder array; a second array; means coupling said adder array to said second array; means coupling said switching array to said second array; a carry circuit; means coupling said carry circuit to said adder array; whereby input signals applied to said first array and control signals from said switching array cause said input signals to be added sequentially in said adder array, said adder array applying a sum signal to said second array and a carry signal to said carry circuit, and said carry circuit applying said carry signal to said adder array.

5. A cryogenic binary serial adder employing rectangular array inhibitor logic comprising: a first group of input storage devices each having inputs and groups of outputs; a second group of input storage devices each having inputs and groups of outputs; a first array including a plurality of groups of vertical lines and a plurality of horizontal lines having inhibitors placed at selected points of interaction of said lines; means to apply current sequentially to said horizontal lines; an adder array including a plurality of vertical lines and a plurality of horizontal lines having inhibitors placed at selected points of interaction of said lines; means coupling said groups of outputs of said storage devices to said groups of vertical lines of said first array; means connecting the horizontal lines of said first array to certain of the horizontal lines of said adder array; means applying current to said adder array, a carry circuit coupled to certain of the vertical lines and other horizontal lines of said adder array; an output storage circuit coupled to other vertical lines of said adder array; whereby output signals from said groups of ouputs cause current through selected ones of the horizontal lines of said first array to be inhibited thereby allowing current through certain of the horizontal lines of said adder array, and said carry circuit causes current through other horizontal lines of said adder array causing current to be inhibited in selected vertical lines of said adder array thereby allowing sum and carry currents in the remaining vertical lines of said adder array.

6. A cryogenic serial adder employing rectangular array inhibitor logic comprising: a first group of storage devices having input lines and output lines, a second group of storage devices having input lines and output lines, a first array including a plurality of vertical lines and a plurality of horizontal lines having inhibitors placed at selected points of interaction of said horizontal and vertical lines, means to apply current sequentially to the horizontal lines of said first array, means connecting the output lines of said first group of storage devices to a portion of the vertical lines of said first array, means connecting the output lines of said second group of storage devices to the remaining vertical lines of said first array, an adder array including a plurality of vertical lines and a plurality of horizontal lines having inhibitors placed at selected points of interaction of said line, means connecting the horizontal lines of said first array to certain of the horizontal lines of said adder array, means to apply current to the vertical lines of said adder array, a carry storage circuit having input lines and output lines, means connecting certain of the vertical lines of said adder array to the input lines of said carry storage device, means connecting the output lines of said carry storage device to the remaining horizontal lines of said adder array, an output storage device coupled to the remaining vertical lines of said adder array, whereby output signals from said first and second groups of storage devices establish current in selected ones of the vertical lines of said first array thereby inhibiting current through certain horizontal lines of said first array and diverting current through certain other horizontal lines of said first array, whereby current is established in certain horizontal lines of said adder array which in turn inhibits current from flowing in certain vertical lines of the adder array and permits current through other vertical lines of said adder array, said carry storage circuit establishing current in certain other horizontal lines of said adder array which causes current to be inhibited from selected vertical lines of said adder array whereby currents representing sum and carry may flow in the remaining vertical lines of said adder array.

7. The apparatus of claim 6 wherein the means to apply current sequentially to said horizontal lines of the first array is a cryogenic stepping switch.

References Cited in the file of this patent

Buck: The Cryotron—A Superconductive Computer Element, Proceedings of the IRE, vol. 44, pages 482–493, No. 4, April 1956.

Richards: Arithmetic Operations in Digital Computers, D. Van Nostrand and Co. Inc., Princeton, N.J., March 17, 1955, page 129, Figures 4–30.